US006389391B1

(12) United States Patent
Terauchi

(10) Patent No.: US 6,389,391 B1
(45) Date of Patent: *May 14, 2002

(54) VOICE CODING AND DECODING IN MOBILE COMMUNICATION EQUIPMENT

(75) Inventor: Toru Terauchi, Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/626,583

(22) Filed: Apr. 2, 1996

(30) Foreign Application Priority Data

Apr. 5, 1995 (JP) ............................................ 7-080355
Mar. 7, 1996 (JP) ............................................ 8-050364

(51) Int. Cl.[7] ......................... G10L 15/00; G10L 21/00
(52) U.S. Cl. ....................................... 704/233; 704/226
(58) Field of Search ................................ 704/201, 208, 704/216, 217, 219, 229, 220, 226, 233; 375/254; 379/409, 410

(56) References Cited

U.S. PATENT DOCUMENTS 5,463,716 A 10/1995 Taguchi ...................... 704/209
5,485,522 A * 1/1996 Solve et al. ................ 704/226
5,537,509 A * 7/1996 Swaminathan et al. ..... 704/228
5,553,190 A * 9/1996 Ohya et al. ................. 704/219
5,553,192 A * 9/1996 Hayata ....................... 704/228

FOREIGN PATENT DOCUMENTS

| | | | |
|---|---|---|---|
| EP | 0433015 | 6/1991 | ............ H04B/1/66 |
| EP | 0673013 | 9/1995 | ............ G10L/5/06 |
| JP | 1-173100 | 12/1987 | |
| JP | 4-086032 | 7/1990 | |

* cited by examiner

*Primary Examiner*—Patrick N. Edouard
(74) *Attorney, Agent, or Firm*—Rothwell, Figg, Ernst & Manbeck

(57) ABSTRACT

Digital mobile communication equipment a voice power calculating section 12 for calculating the voice power of digital voice signals converted by the A/D conversion section 2; a noise level comparing section 13 for comparing the results from the voice power calculating section 12 with a threshold level indicating noise level, and for replacing the voice signals with other signals such as all "0" data or comfort noise when the voice signals are determined to be at noise level, a voice coding section 8 for coding the output of the noise level comparing section 13, and a forward error correction coding section 9 for conducting forward error correction coding.

10 Claims, 18 Drawing Sheets

VOICE CODING AND DECODING IN MOBILE COMMUNICATION EQUIPMENT

BACKGROUND OF THE INVENTION

1. Field of the Invention

The present invention relates to digital mobile communication equipment provided with a Speech Coder and Decoder, and particularly to the processing of voice signals at low levels which approximate that of background noise.

2. Description of the Related Art

FIG. 18 is a block diagram illustrating part of known mobile communication equipment. Referring to this Figure, reference numeral 1 denotes a microphone for inputting a voice for the mobile communication equipment 100; reference numeral 2 denotes an A/D conversion section for converting analog voice signals into digital voice signals; reference numeral 3 denotes a speaker for outputting voice signals; and reference numeral 4 denotes a D/A converter for converting digital voice signals into analog voice signals.

Reference numeral 5 denotes a digital voice signal processing section comprising a voice coding section 8 for coding digital voice signals, a forward error correction (FEC) coding section 9 for performing forward error correction coding, a forward error correction decoding section 10 and a voice decoding section 11 for decoding received coded digital signals.

Reference numeral 6 denotes a time division multiple access (TDMA) timing control section for controlling the timing for time division multiple access; and reference numeral 7 denotes a control section for controlling the entire mobile communication equipment 100, the control section including a CPU and program for operating the CPU, etc.

Next, the operation will be described according to the Figure. Here, common operations of the mobile communication equipment, such as wireless signal transmission and reception, are not particularly related to the present invention, and therefore explanation thereof is omitted.

When communicating by using the mobile communication equipment 100, first, voice is input from the microphone 1, and the analog voice signals are converted into digital voice signals by the A/D conversion section 2. The digital voice signals are coded by the digital voice signal processing section 5, and the information coded by the digital voice signal processing section 5 is transmitted by the control section 7 for controlling the entire mobile communication equipment 100 and the time division multiple access timing control section 6.

Next, regarding receiving, only the voice information is extracted from the transmitted information by the time division multiple access timing control section 6 and the control section 7, and is input to the digital voice signal processing section 5 where the information is decoded, and the digital voice signals are converted into analog voice signals by means of the D/A converter 4, thereby outputting voice from the speaker 3.

Since the known mobile communication equipment is constructed as described above, both background noise and voice signals at a level as low as the background noise are transmitted to the receiving party along with the actually necessary voice signals, decoded, and output from the speaker as voice signals. Consequently, and particularly in the case where a high-sensitivity microphone is employed, background noise and voice signals at a level as low as the background noise are mixed into the voice signals, making for a problem where it becomes very difficult to hear the voice signals.

SUMMARY OF THE INVENTION

The present invention has been are achieved to solve the above-described problems. It is an object of the present invention to provide mobile communication equipment capable of controlling the noise level of voice signals which are being transmitted or received during communication, and reducing irritating sounds for the receiving party.

In light of the above object, according to a first aspect of the present invention, there is provided digital mobile communication equipment provided with a Speech Coder and Decoder, the mobile communication equipment comprising: an A/D conversion feature for converting analog voice signals into digital voice signals; voice coding feature for calculating the voice power value of the digital voice signals from the A/D converter and outputting the aforementioned digital voice signal as it is when the voice power value is equal to or greater than a predetermined value and for outputting the aforementioned digital voice signal as zero when the voice power value is smaller than the predetermined value; and forward error correction coding feature for inputting the coded digital voice signals from the coding feature and for outputting the coded digital voice signals on which forward error correction coding has been performed.

According to a second aspect of the present invention, there is provided digital mobile communication equipment according to the first aspect of the invention, wherein the aforementioned coding feature comprises: a voice power calculating section for calculating the voice frame power value of the digital voice signals from the aforementioned A/D converter as voice power value; a noise level comparing section for outputting the aforementioned digital voice signal as it is when the voice power value is equal to or greater than a predetermined value and for outputting the aforementioned digital voice signal as zero when the voice power value is smaller than the predetermined value; and a voice coding section for outputting the aforementioned digital voice signals output by the noise level comparing section as voice-coded digital voice signals.

According to a third aspect of the present invention, there is provided digital mobile communication equipment according to the first aspect of the invention, wherein the aforementioned coding feature is comprises: a voice coding section for calculating the R0 value from VSELP processing of the digital voice signals from the aforementioned A/D converter as voice power value, which then conducts voice coding processing from the voice power value and outputs the coded digital voice signal when the voice power value is equal to or greater than a predetermined value, and takes the voice power value to be zero when the voice power value is smaller than the predetermined value so that no voice coding processing is conducted.

According to a fourth aspect of the present invention, there is provided digital mobile communication equipment according to the first aspect of the invention, wherein the voice coding section outputs coded digital voice signals for generating comfort noise when the voice power value is smaller than the predetermined value.

According to a fifth aspect of the present invention, there is provided digital mobile communication equipment according to the fourth aspect of the invention, wherein the aforementioned coding feature comprises: a voice coding section for converting digital voice signals from the aforementioned A/D conversion means into coded digital voice signals; and a coded power comparison section for calculating the R0 value based on VSELP algorithms of the coded digital voice signals from the voice coding section as voice power value, which then outputs the aforementioned coded digital voice signal as it is when the voice power value is equal to or greater than a predetermined value, and outputs coded digital voice signals for generating comfort noise when the voice power value is smaller than the predetermined value.

According to a sixth aspect of the present invention, there is provided digital mobile communication equipment provided with a Speech Coder and Decoder, the mobile communication equipment comprising: forward error correction decoding feature for performing forward error correction decoding to received coded digital voice signals and outputting the decoded coded digital voice signals thereof; decoding feature for calculating the voice power value regarding the coded digital voice signals from the forward error correction decoding feature and outputting the digital voice signal decoded as it is from the coded digital signal when the voice power value of the coded digital voice signals is equal to or greater than a predetermined value, and for outputting signals as a voice power value of zero when the voice power value is smaller than the predetermined value; and D/A converting feature for converting digital voice signals output from the decoding feature into analog voice signals.

According to a seventh aspect of the present invention, there is provided digital mobile communication equipment according to the sixth aspect of the invention, wherein the aforementioned decoding feature comprises: a voice decoding section for outputting digital voice signals decoded from the coded digital voice signals from the aforementioned forward error correction decoding feature; a voice power calculating section for calculating the voice frame power value of the digital voice signals from the voice decoding section as voice power value; and a noise level comparing section for outputting the aforementioned digital voice signal as it is when the voice power value is equal to or greater than a predetermined value and for outputting the digital voice signal as zero when the voice power value is smaller than the predetermined value.

According to an eighth aspect of the present invention, there is provided digital mobile communication equipment according to the sixth aspect of the invention, wherein the aforementioned decoding feature comprises: a coded power comparison section for calculating the R0 value based on VSELP algorithms of the coded digital voice signals from the aforementioned forward error correction decoding feature as voice power value, and then compares the voice power value with predetermined values; and a voice decoding section which conducts voice decoding processing from the voice power value and outputs the digital voice signal when the voice power value is equal to or greater than a predetermined value, and takes the voice power value to be zero when the aforementioned voice power value is smaller than the predetermined value so that no voice decoding processing is conducted.

According to a ninth aspect of the present invention, there is provided digital mobile communication equipment according to the sixth aspect of the invention, wherein the voice decoding section outputs digital voice signals for generating comfort noise when the voice power value is smaller than the predetermined value.

According to a tenth aspect of the present invention, there is provided digital mobile communication equipment according to the ninth aspect of the invention, wherein the aforementioned coding feature comprises: a coded power comparison section for calculating the R0 value based on VSELP algorithms of the coded digital voice signals from the aforementioned forward error correction decoding feature as voice power value, which then outputs the aforementioned coded digital voice signal as it is when the voice power value is equal to or greater than a predetermined value, and outputs coded digital voice signals for generating comfort noise when the voice power value is smaller than the predetermined value; and a voice decoding section for decoding coded digital voice signals from the aforementioned coded power comparison section.

DETAILED DESCRIPTION OF THE PREFERRED EMBODIMENTS

When, for example, mobile communication equipment of the present invention is used in North America or Japanese digital cellular system (full rate), an algorithm of Vector Sum Excited Linear Predicative Coding (hereinafter referred to as "VSELP") is applied to digital voice signal processing. The following embodiments of the present invention will be described by assuming that the digital voice signal processing of the present invention is VSELP, and forward error correction coding and forward error correction decoding functions are provided in the digital voice signal processing.

FIRST EMBODIMENT

Figure 1:
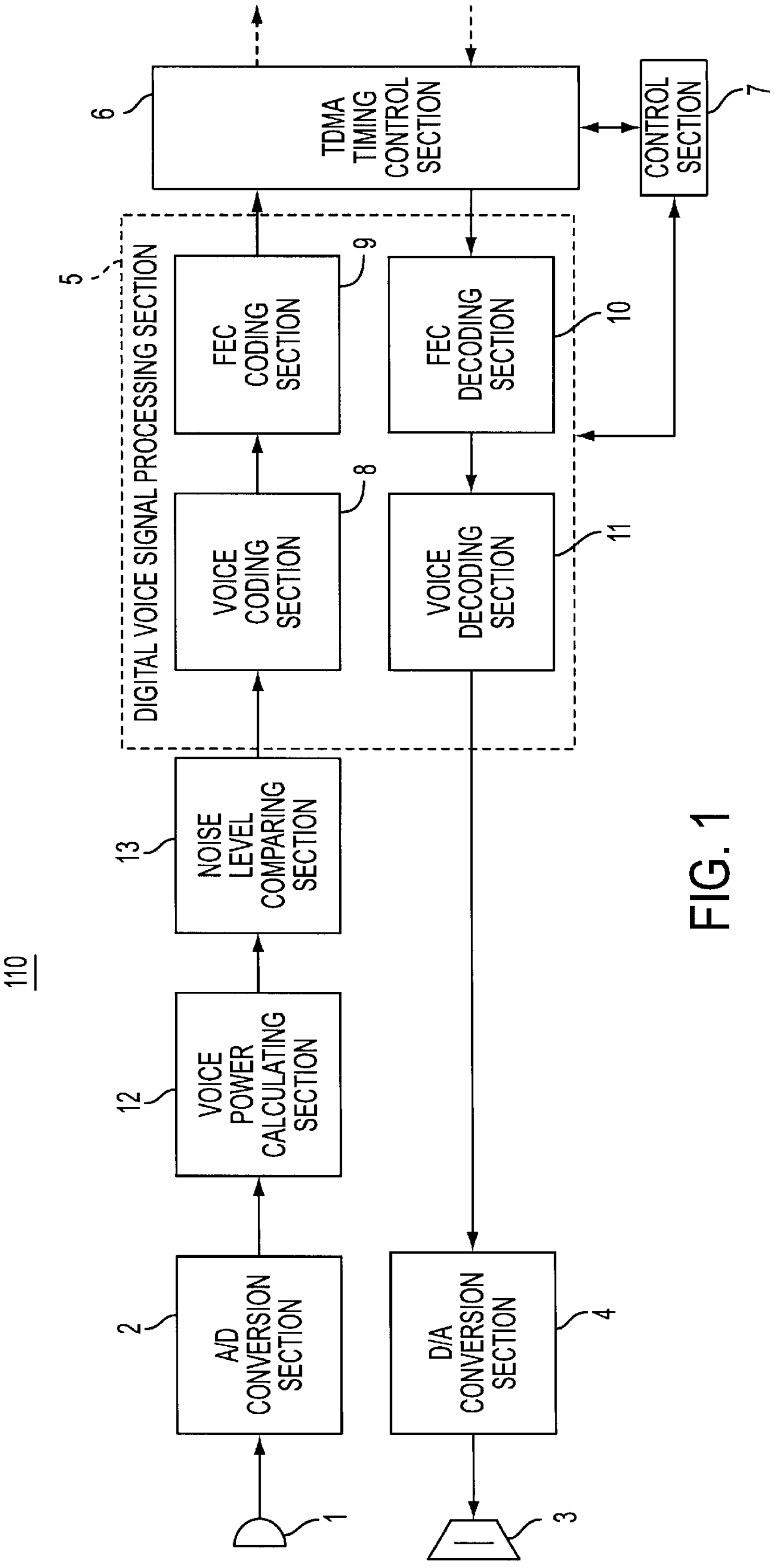
FIG. 1 is a block diagram illustrating the construction of mobile communication equipment in accordance with an embodiment of the present invention.

FIG. 1 is a block diagram illustrating the construction of mobile communication equipment of one embodiment of the present invention. Referring to the mobile transportation equipment 110 shown in FIG. 1, reference numeral 1 denotes a microphone; reference numeral 2 denotes an A/D converter; reference numeral 3 denotes a speaker; and reference numeral 4 denotes a D/A converter. Reference numeral 5 denotes a digital voice signal processing section comprising a voice coding section 8, a forward error correction coding section 9, a forward error correction decoding section 10, and a voice decoding section 11. Reference numeral 6 denotes a time division multiple access timing control section; reference numeral 7 denotes a control section; reference numeral 12 denotes a voice power calculating section; and reference numeral 13 denotes a noise level comparing section.

Figure 2:
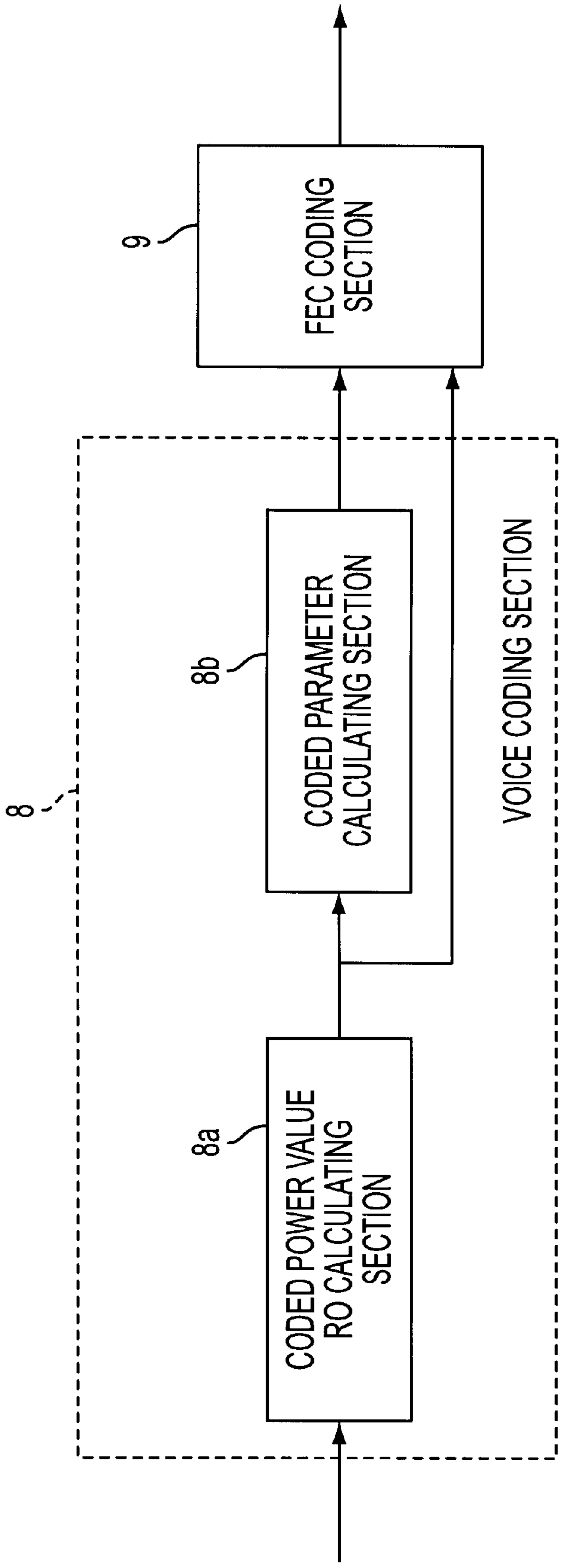
FIG. 2 is a block diagram illustrating the inner construction of the voice coding section of FIG. 1.

Next, FIG. 2 illustrates an internal block diagram of the voice coding section 8. In the voice coding section 8, the later-described coded power value R0, which is a type of coded voice signal, is compiled according to the VSELP algorithm by the coded power value R0 calculating section 8*a*, and coded digital voice signals, another type of coding parameter, are generated in the coding parameter calculating section 8*b* based on this R0 value.

Figure 3:
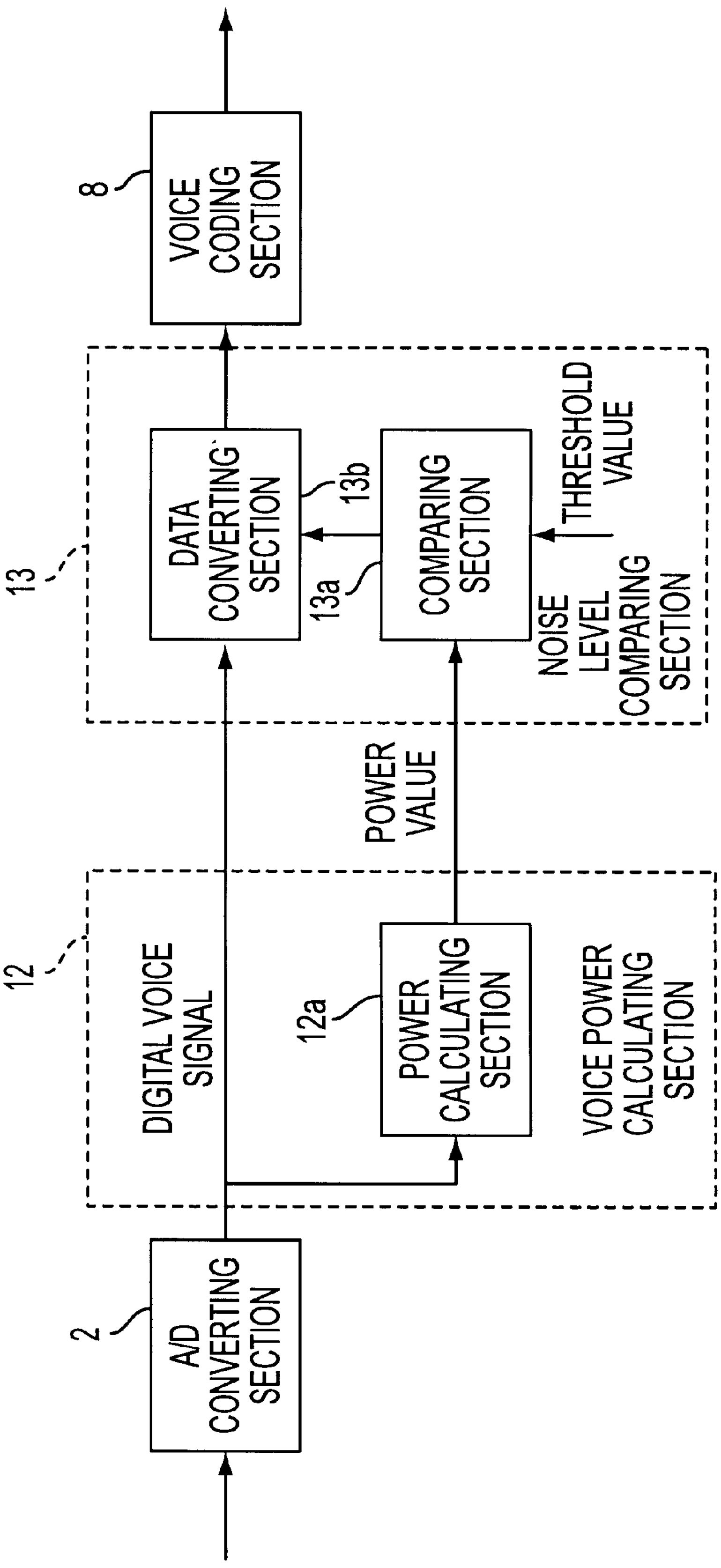
FIG. 3 is a block diagram illustrating the inner construction of the voice power calculating section and noise level comparing section of FIG. 1.
Figure 4:
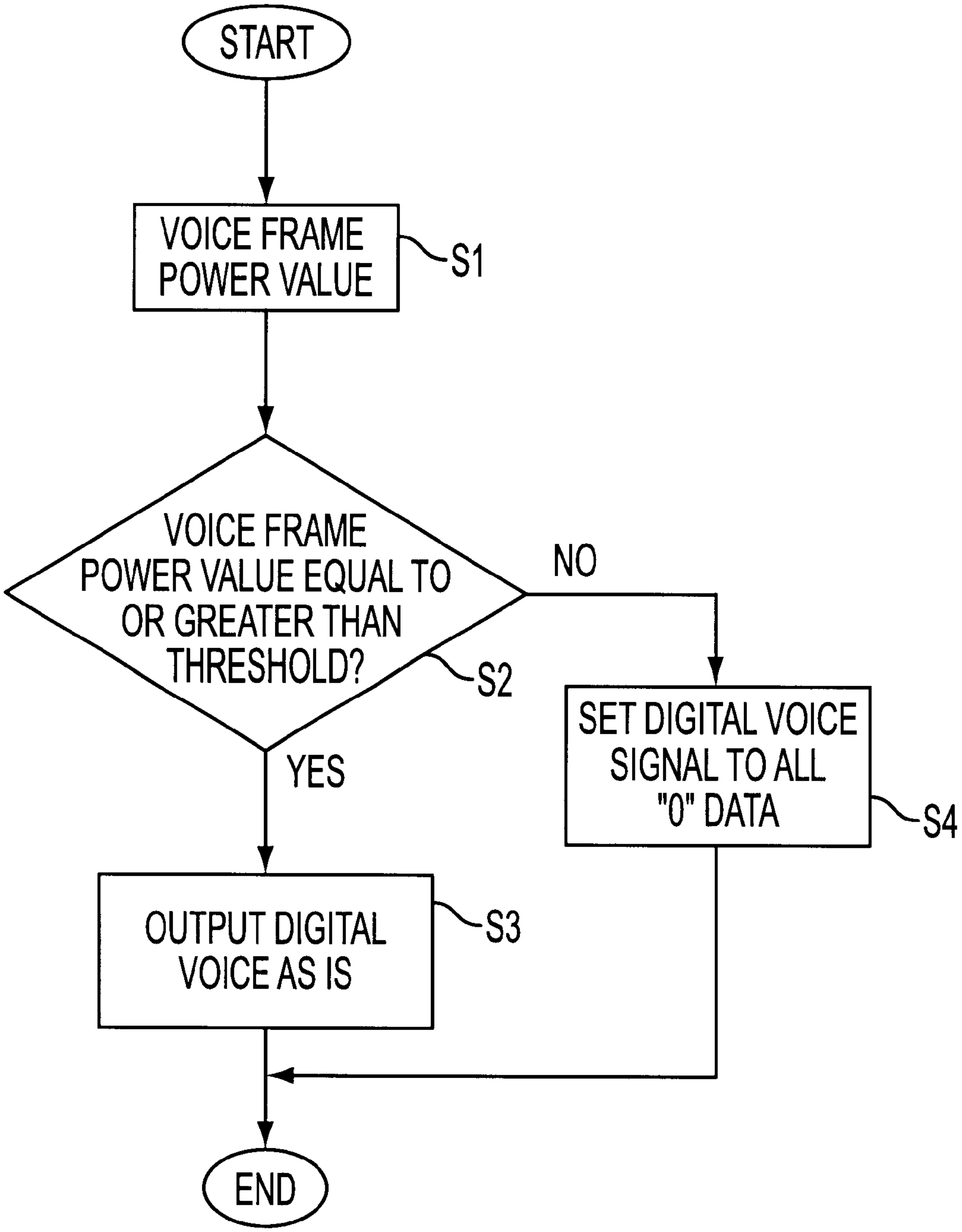
FIG. 4 is a flowchart for describing the operation of the mobile communication equipment of FIG. 1.

Also, FIG. 3 illustrates a block diagram of the inner construction of the voice power calculating section 12 and noise level comparing section 13 of FIG. 1, which are characteristic of the present embodiment. The voice power calculating section 12 outputs digital voice signals as they are, and also is provided with a power calculating section 12*a* which calculates voice power from the digital voice signals. The noise level comparing section 13 is comprised of a comparing section 13*a* which compares the power value obtained from the power calculating section 12*a* with a internally maintained threshold value, and a data conversion section 13*b* which conducts conversion of digital voice signals based on these comparison results. Further, FIG. 4 illustrates a flowchart of the operations of the voice power calculating section 12 and the noise level comparing section 13.

Moreover, the A/D conversion section 2 comprises the A/D conversion means; the voice power calculating section 12, the noise level comparing section 13, and the voice coding section 8 comprise the coding means; and the forward error correction coding section 9 comprises the forward error correction coding means.

The operation of the mobile communication equipment will now be described according to FIG. 1 to FIG. 4. On the sending side, voice is input from the microphone 1, and analog voice signals are converted into digital voice signals by the A/D conversion section 2. The frame power value (voice power value) of the converted digital voice signals is calculated by the power calculating section 12*a* of the voice power calculating section 12 on the basis of an auto-correlation function calculation or the like which is commonly used in voice signal processing (Step S1).

Now, "frame power" refers to such as described next. Generally, with known digital cellular systems such as described above, the data is subjected to time division multiple access, so as to handle multiple users. A "frame" refers to a single unit of data into which the multiple-access data is made. For example, with the case of the aforementioned North America digital cellular system, one frame is comprised of a time length of 20 msec. The frame power is defined as being the average power of this one frame.

Next, in the comparing section 13*a*, the noise level calculating section 13 compares the calculated voice frame power value with a preset noise level determination threshold value (Step S2). When the voice frame power value of the voice is smaller than the threshold value, the voice is determined to be at a noise level, and the determination results are transferred to the data conversion section 13*b*. In the event that the power is equal to or greater than the threshold value, the digital voice signal is output as it is (Step S3). When the power is below the threshold value, the digital voice signals are replaced with digital voice signals at the same level as when nothing is input (for example, the digital voice signals are set to all "0" data) (Step S4).

The converted digital voice signals are coded by the digital voice signal processing section 5, and then the information coded by the digital voice signal processing section 5 is transmitted by the control section 7, which controls the entire mobile communication equipment 110, and the time division multiple access timing control section 6.

On the other hand, at the receiving party, the coded voice signals of the transmitted information are input to the digital voice signal processing section 5 by the time division multiple access timing control section 6 and the control section 7, the digital voice signals are converted into analog voice signals by the D/A converter 4, and voice is output from the speaker 3.

With the above-described construction, the voice power calculating section 12 calculates the voice frame power on the basis of an auto-correlation function calculation or the like, and the noise level comparing section 13 compares the voice frame power with a threshold value. Thus, since the noise level determination accuracy is improved, and the noise level can be determined reliably, it is possible to prevent voice signals which will become irritating sounds from being transmitted.

SECOND EMBODIMENT

Figure 5:
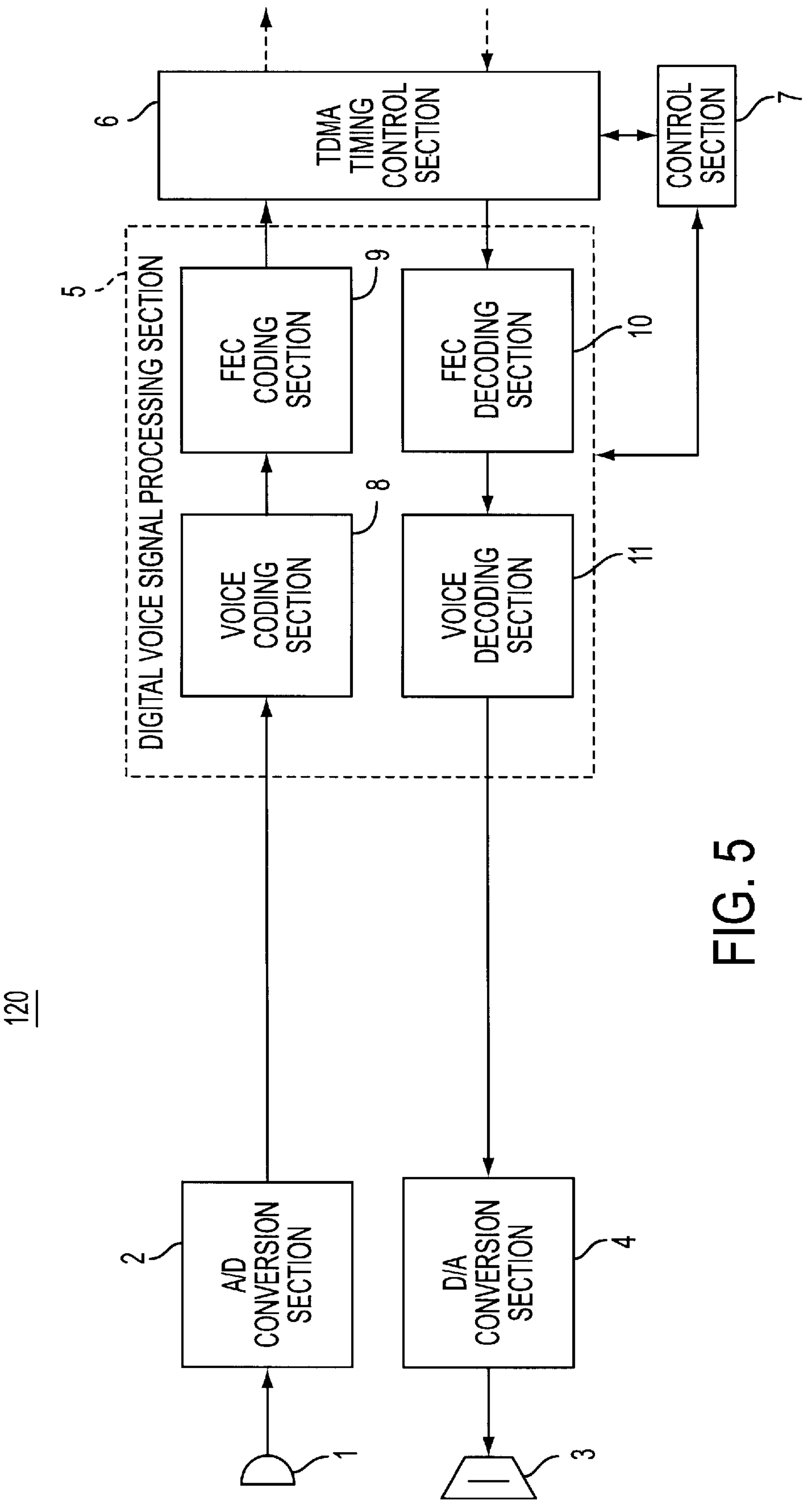
FIG. 5 is a block diagram illustrating the construction of mobile communication equipment in accordance with another embodiment of the present invention.
Figure 6:
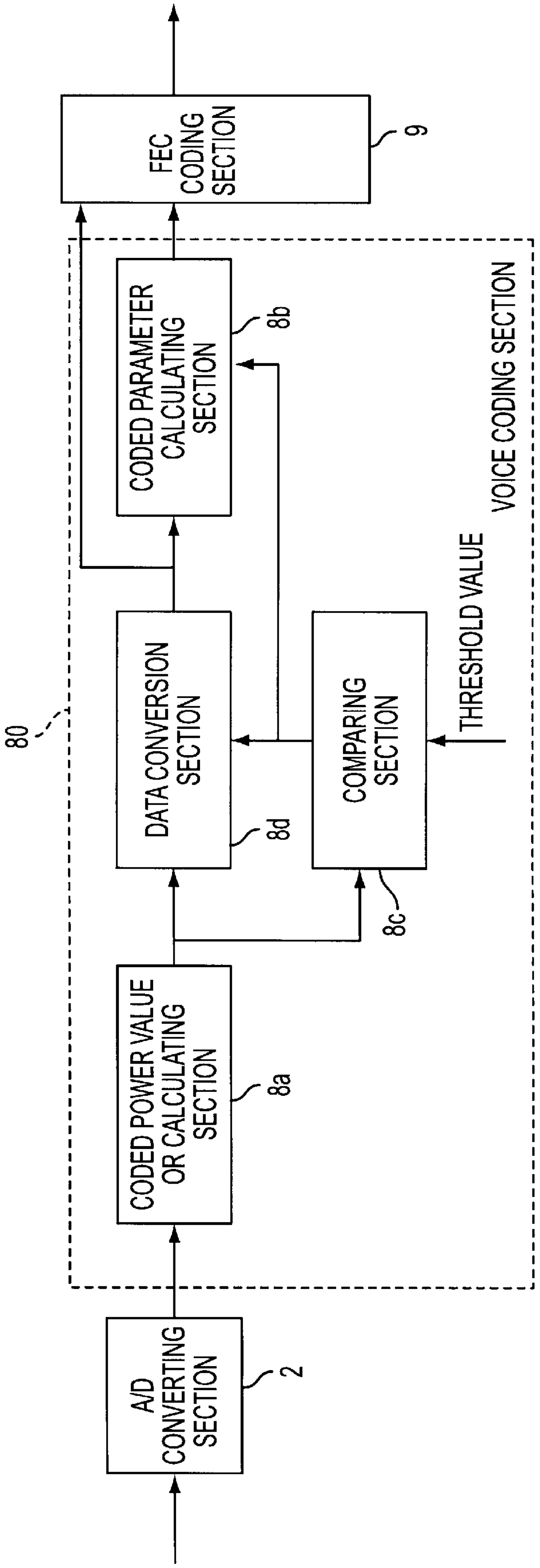
FIG. 6 is a block diagram illustrating the inner construction of the voice coding section of FIG. 5.

FIG. 5 is a block diagram illustrating the construction of mobile communication equipment in accordance with another embodiment of the present invention. The internal components of the voice coding section 80 of the mobile communication equipment 120 in accordance with this second embodiment differs with that of the first embodiment. FIG. 6 illustrates an internal block diagram of the voice coding section which is characteristic of the present embodiment. The components in FIG. 5 and FIG. 6 which are the same or equivalent as those above are given the same reference numerals, and an explanation thereof is omitted.

Figure 7:
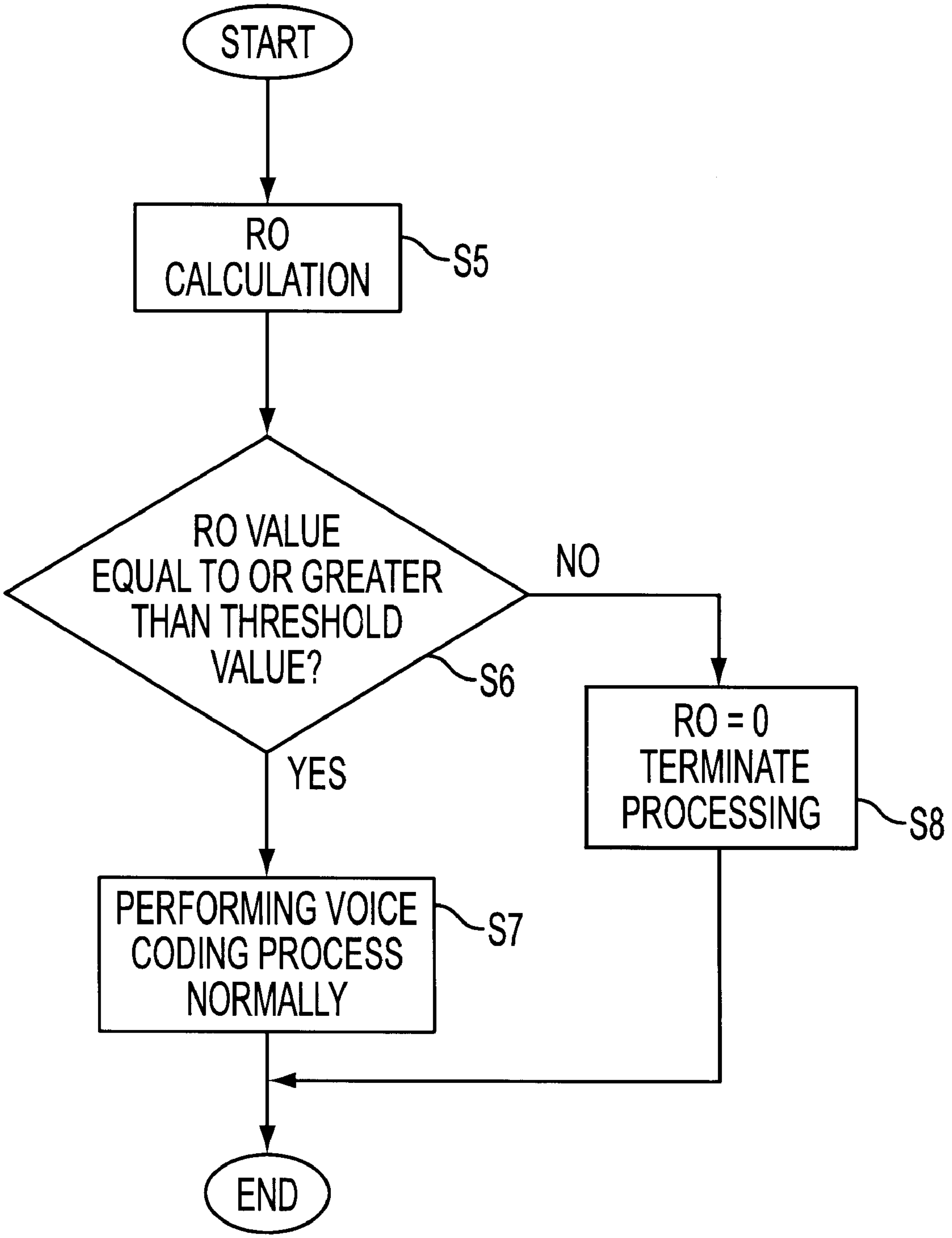
FIG. 7 is a flowchart for describing the operation of the mobile communication equipment of FIG. 5.

As shown in FIG. 6, the voice coding section 80 has the following components added: a comparing section 8*c* which compares the R0 value (voice power value) from the coded power value R0 calculating section 8*a* with an internally provided threshold value; and a data conversion section 8*d* for conducting conversion to R0 value based on the results of the comparison made in the comparing section 8*c*. Also, FIG. 7 shows a flowchart of the operations of the voice coding section 80.

Here, the A/D conversion section 2 comprises the A/D conversion means, the voice coding section 80 comprises the coding means, and the forward error correction coding section 9 comprises the forward error correction coding means.

The operation of the mobile communication equipment shown in FIG. 5 to FIG. 7 will now be described. First, on the transmitting side, the R0 value for the digital signals from the A/D conversion section 2 is calculated by the coded power value R0 calculating section 8*a* within the voice coding section 80, by means of standard VSELP processing (Step S5). The coded power value R0 is used in the VSELP algorithm, and shows the voice power at 32 levels (0 to 31) on the basis of its original voice power calculation. This is called the coded power value R0. When R0 is 0, the voice power reaches a minimum, and when 31, the voice power reaches a maximum.

Next, in the comparing section 8*c*, comparison is made with a preset noise level determination threshold value (Step S6), and in the event that R0 is smaller than the threshold value, it is determined to be at a noise level, and the determination results are transferred to the data conversion section 8*d* and the coding parameter calculating section 8*b*. In the event that the R0 value is equal to or greater than the threshold value, the data conversion section 8*d* outputs the R0 value of the coded power value R0 calculating section 8*a* as it is, and this R0 value is used by the coded parameter calculating section 8*b* to conduct standard voice coding processing (Step S7). When the R0 value is smaller than the threshold value, the data conversion section 8*d* replaces the parameter of the coded power value R0 of VSELP with "0", and processing by the coding parameter calculating section 8*b* is terminated (Step S8).

Following forward error correction coding of the converted coded power value R0 and the other coded voice signals by the forward error correction coding section 9, the converted coded power value R0 and the other coded voice signals are transmitted by the control section 7, which controls the entire mobile communication equipment 120, and the time division multiple access timing control section 6.

On the other hand, at the receiving party, the coded voice signals which have been subjected to the aforementioned noise control by means of the time division multiple access timing control section 6 and control section 7 are input to the digital voice signal processing section 5 and decoded, the digital voice signals are converted into analog voice signals by the D/A converter 4, and voice is output from the speaker 3.

With the above-described construction, since the data conversion section 8*d* of the voice coding section 80 sets the coded power value R0 at "0" when the voice power value is smaller than the threshold value, voice coding processing at the coding parameter calculating section 8*b* can be omitted. Thus, it is possible to shorten the voice coding processing time and to reduce consumption of power.

THIRD EMBODIMENT

Figure 8:
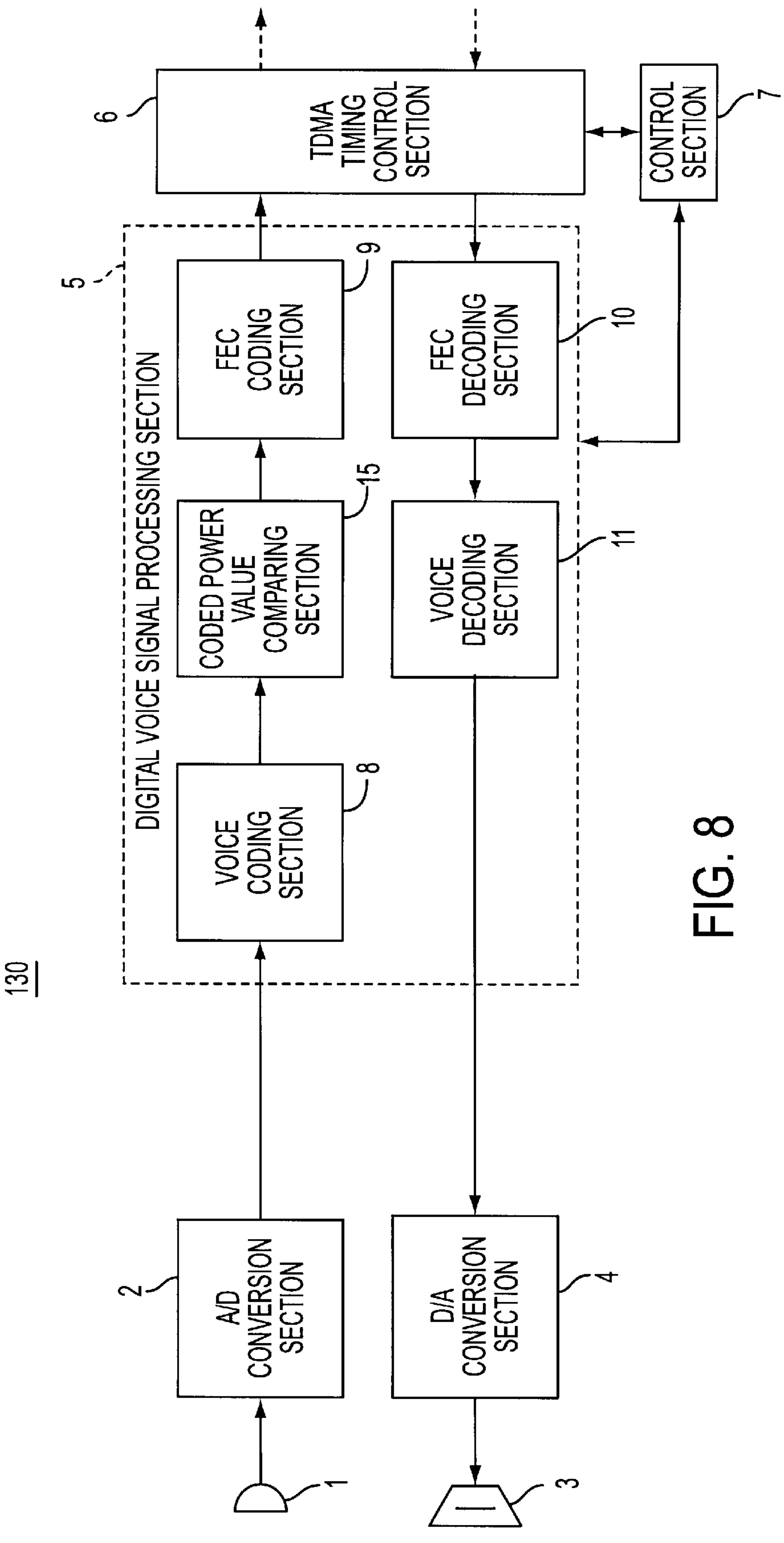
FIG. 8 is a block diagram illustrating the construction of mobile communication equipment in accordance with another embodiment of the present invention.
Figure 9:
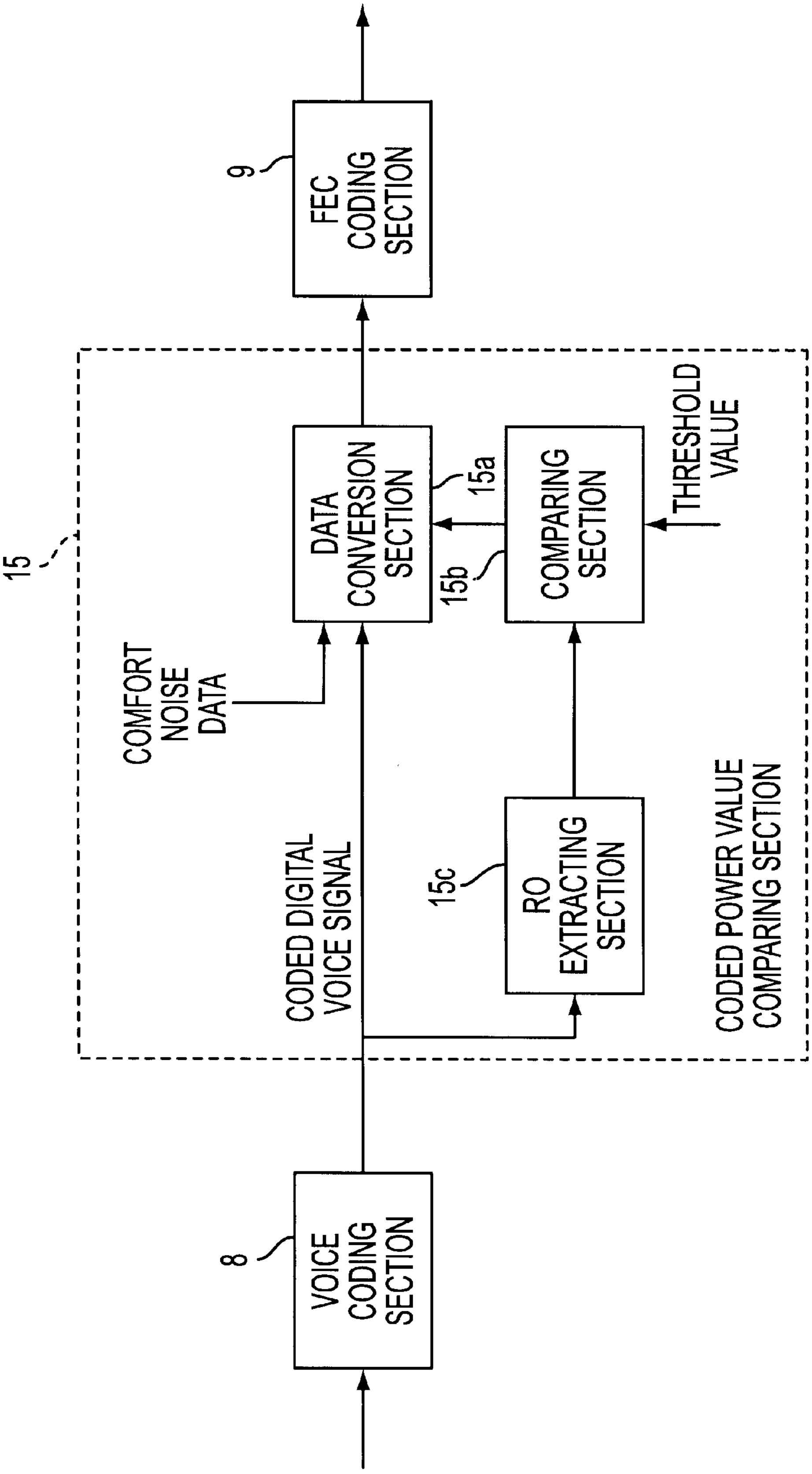
FIG. 9 is a block diagram illustrating the inner construction of the coded power comparison section of FIG. 8.

FIG. 8 is a block diagram illustrating the construction of mobile communication equipment in accordance with another embodiment of the present invention. With the mobile communication equipment 130 according to this third embodiment, a coded power value comparing section 15 has been provided to the digital voice signal processing section 5. FIG. 9 shows an internal block diagram of the coded power value comparing section 15. The components in FIG. 8 and FIG. 9 which are the same as or equivalent to those in the above embodiments are given the same reference numerals.

Figure 10:
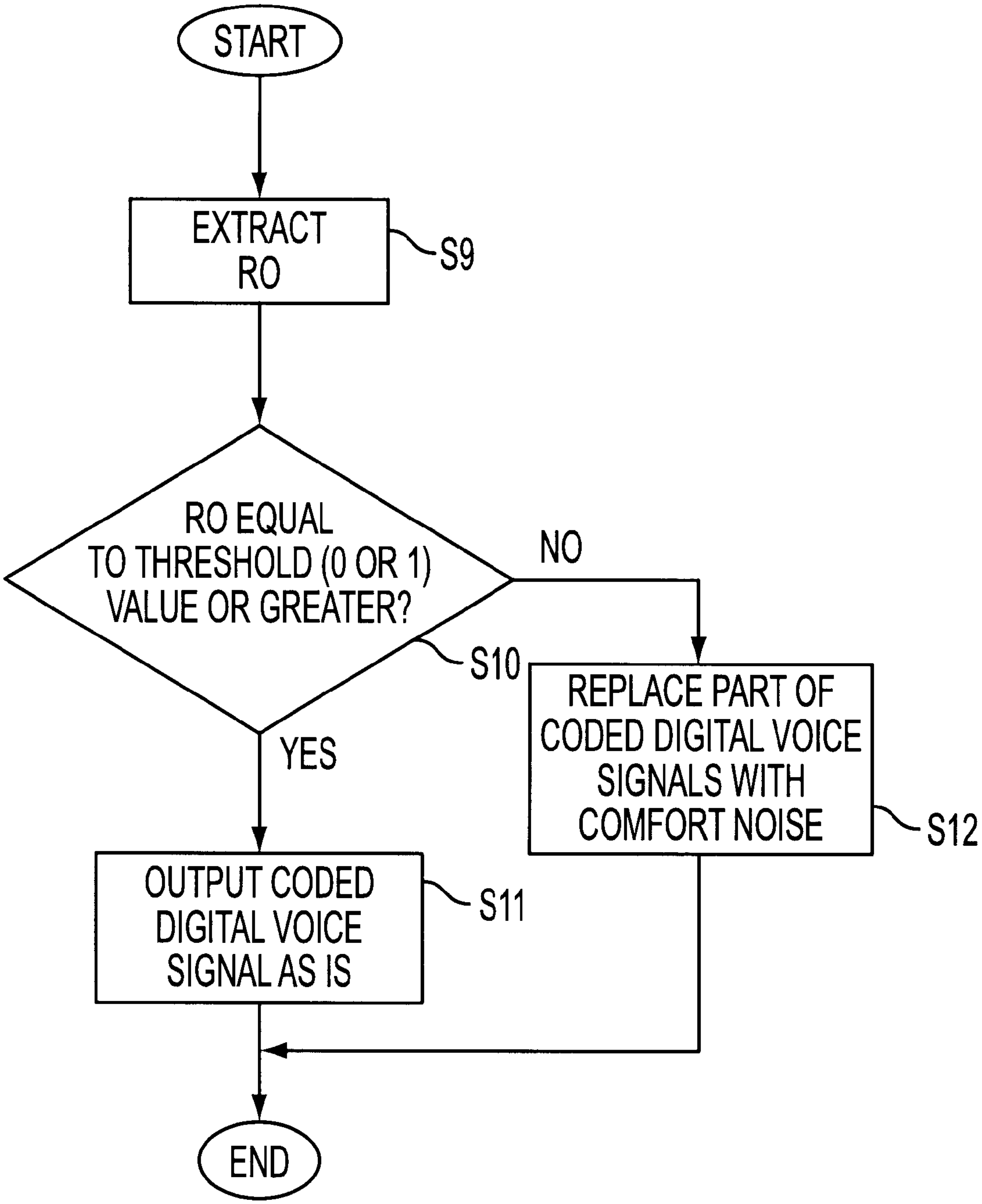
FIG. 10 is a flowchart for describing the operation of the mobile communication equipment of FIG. 8.

In FIG. 9, 15*a* denotes the data conversion section, 15*b* denotes the comparing section, and 15*c* denotes the R0 extracting section. The configurations is such that the R0 extracting section 15*c* extracts the R0 value from the coded digital voice signals, the R0 value of which is then compared with an internally provided threshold value by the comparing section 15*b*, and based on the comparison results, coded digital voice signals are converted by the data converting section 15*a*. FIG. 10 also shows an operational flowchart of the coded power value comparison section 15.

Here, the A/D conversion section 2 comprises the A/D conversion means, the voice coding section 8 and the coded power comparing section 15 comprise the coding means, and the forward error correction coding section 9 comprises the forward error correction coding means.

Next, the operation of the mobile communication equipment shown in FIG. 8 to FIG. 10 will now be described. Voice is input from the microphone 1, the analog voice signals are converted into digital voice signals by the A/D converting section 2, and the digital voice signals converted by the voice coding section 8 are then coded.

The parameters for the coded power value R0 based on the VSELP algorithm which indicates the frame power of the coded digital voice signals are extracted by the R0 extracting section 15*c* within the coded power value comparing section (Step S9) comparison is made in the comparing section 15*b* of this extracted R0 value with a preset threshold value, and in the event that R0=0 or 1, it is determined to be at a noise level, and the determination results are transferred to the data conversion section 15*a* (Step S10). In the event that the R0 value is equal to or greater than the threshold value, the data conversion section 15*a* outputs the coded digital signals from the voice coding section 8 as is (Step S1). When the R0 value is smaller than the threshold value, the data conversion section 15*a* replaces part of the coded digital signal from the voice coding section 8 with coded digital voice signals for generating comfort noise (Step S12).

Following forward error correction coding of the converted coded digital voice signals by the forward error correction coding section 9, the signals converted by the data conversion section 15*a*, and the other coded voice signals, are transmitted by the control section 7, which controls the entire mobile communication equipment 130, and the time division multiple access timing control section 6.

On the other hand, at the receiving party, the coded voice signals which have been subjected to the aforementioned noise control by means of the time division multiple access timing control section 6 and control section 7 are input to the digital voice signal processing section 5 and decoded, the digital voice signals are converted into analog voice signals by the D/A converter 4, and voice is output from the speaker 3.

With the above-described construction, the coded power comparing section 15 extracts the parameters for the coded power value R0 which indicates the frame power of the coded digital voice signals, and when the R0 value is smaller than the threshold value, part of the coded digital signal from the voice coding section 8 is replaced with coded digital voice signals for generating comfort noise. Thus, the noise level determination accuracy is improved, and voice signals which would become irritating sounds can be prevented from being transmitted.

FOURTH EMBODIMENT

Figure 11:
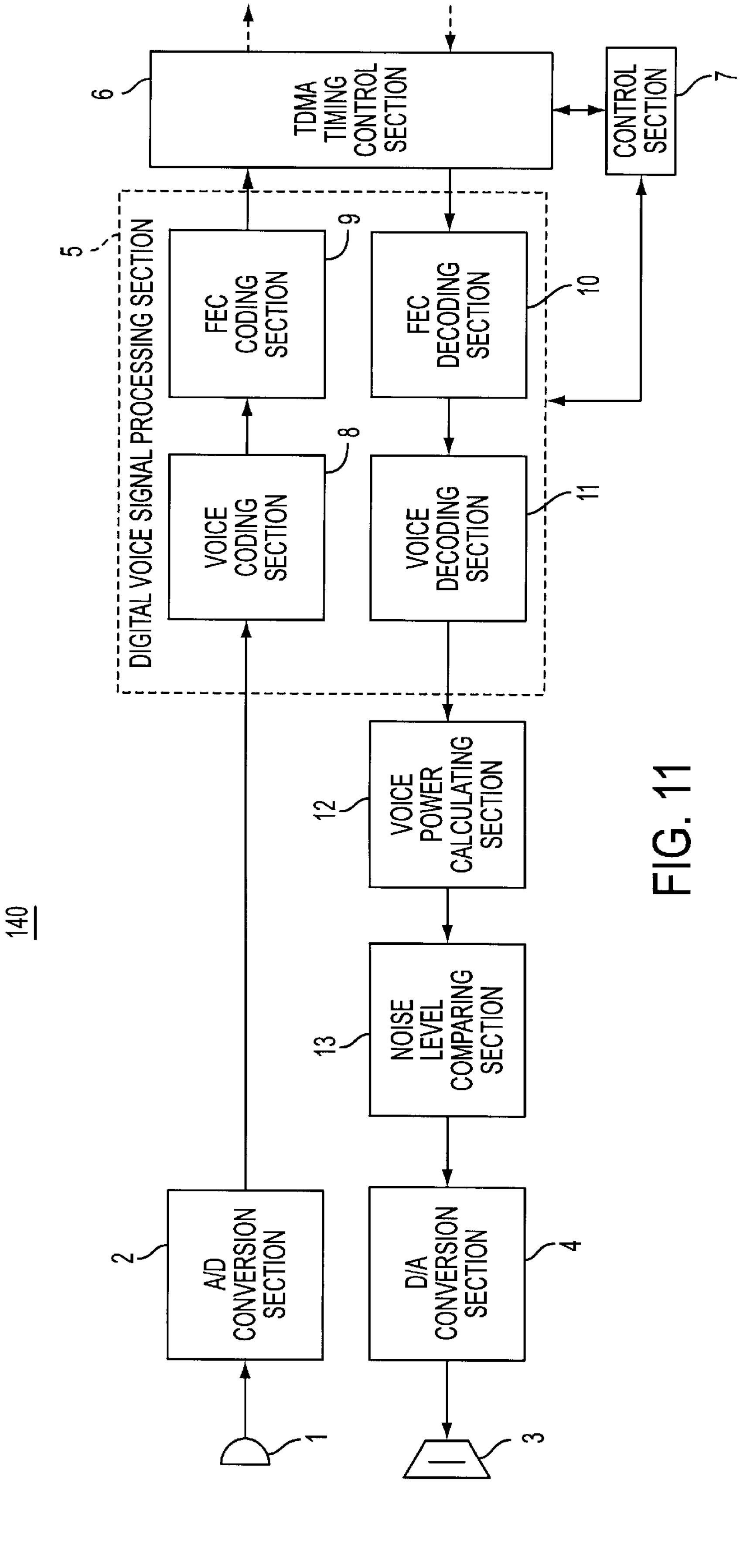
FIG. 11 is a block diagram illustrating the construction of mobile communication equipment in accordance with another embodiment of the present invention.
Figure 12:
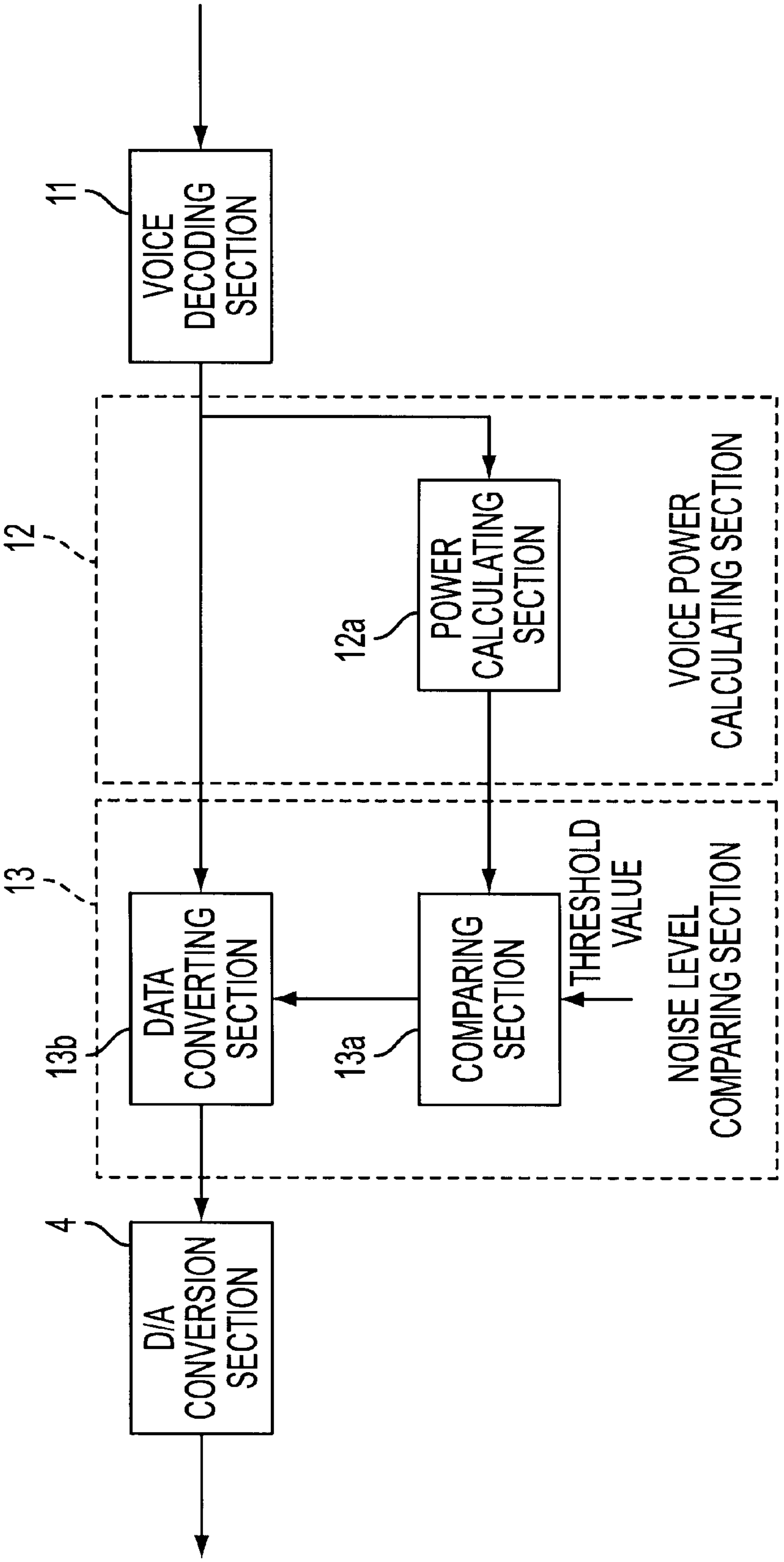
FIG. 12 is a block diagram illustrating the inner construction of the voice power calculating section and noise level comparison section of FIG. 11.

FIG. 11 is a block diagram illustrating the construction of mobile communication equipment in accordance with another embodiment of the present invention. With the mobile communication equipment 140 according to this embodiment, a voice power calculating section 12 and noise level comparing section 13 according to the first embodiment has been provided to the decoding side. FIG. 12 shows an internal block diagram of the voice power calculating section 12 and noise level comparing section 13. The components in FIG. 11 and FIG. 12 which are the same as or equivalent to those in the above embodiments are given the same reference numerals.

Here, the forward error correction decoding section 10 comprises the forward error correction decoding means; the voice decoding section 11, the voice power calculating section 12, and noise level comparing section 13 comprise the decoding means; and the D/A conversion section 4 comprises the D/A conversion means.

The operation of the mobile communication equipment shown in FIG. 11 and FIG. 12 will now be described. Also, the processing of the voice power calculating section 12 and noise level comparing section 13 is basically the same as that of the flowchart shown in FIG. 4, so explanation with reference to a flowchart will be omitted in the explanation of the following operations. At the receiving side, of the information which is transmitted from the transmitting side, the coded digital voice signals are input into the digital voice signal processing section 5, and the information thereof is decoded by means of the forward error correction decoding section 10 and the voice decoding section 11.

The digital voice signals which have been decoded and generated are subjected to voice frame power value (voice power value) calculation according to the method of the first embodiment by the power calculating section 12*a* of the voice power calculating section 12. The voice frame power value calculated in this manner is compared with a preset noise level determination threshold value by the comparing section 13*a* of the noise level comparing section 13. When the voice frame power value is smaller than the threshold value, the voice is determined to be at a noise level, and the digital voice signals are replaced with digital voice signals such as all "0" data by the data conversion section 13*b* according to the method of the first embodiment.

The converted digital voice signals are converted into analog voice signals by the D/A converter 4, and voice is output from the speaker 3.

With the above-described construction, the voice power level calculated by the voice power calculating section 12 is compared with a threshold value by the noise level comparing section 13 to determined the noise level. Thus, the determination accuracy is improved, and irritating sounds can be prevented from being output from the speaker 3.

FIFTH EMBODIMENT

Figure 13:
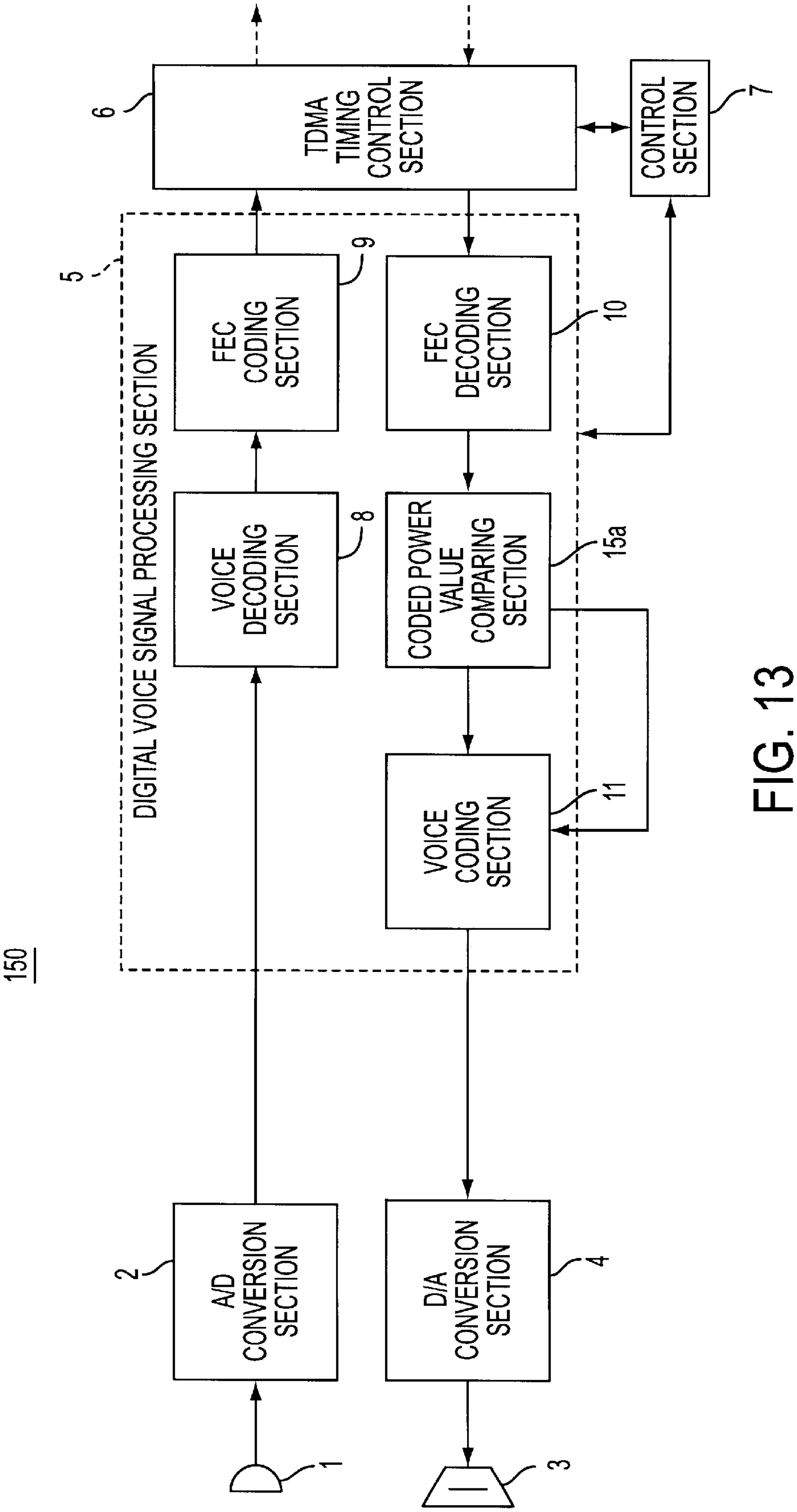
FIG. 13 is a block diagram illustrating the construction of mobile communication equipment in accordance with another embodiment of the present invention.
Figure 14:
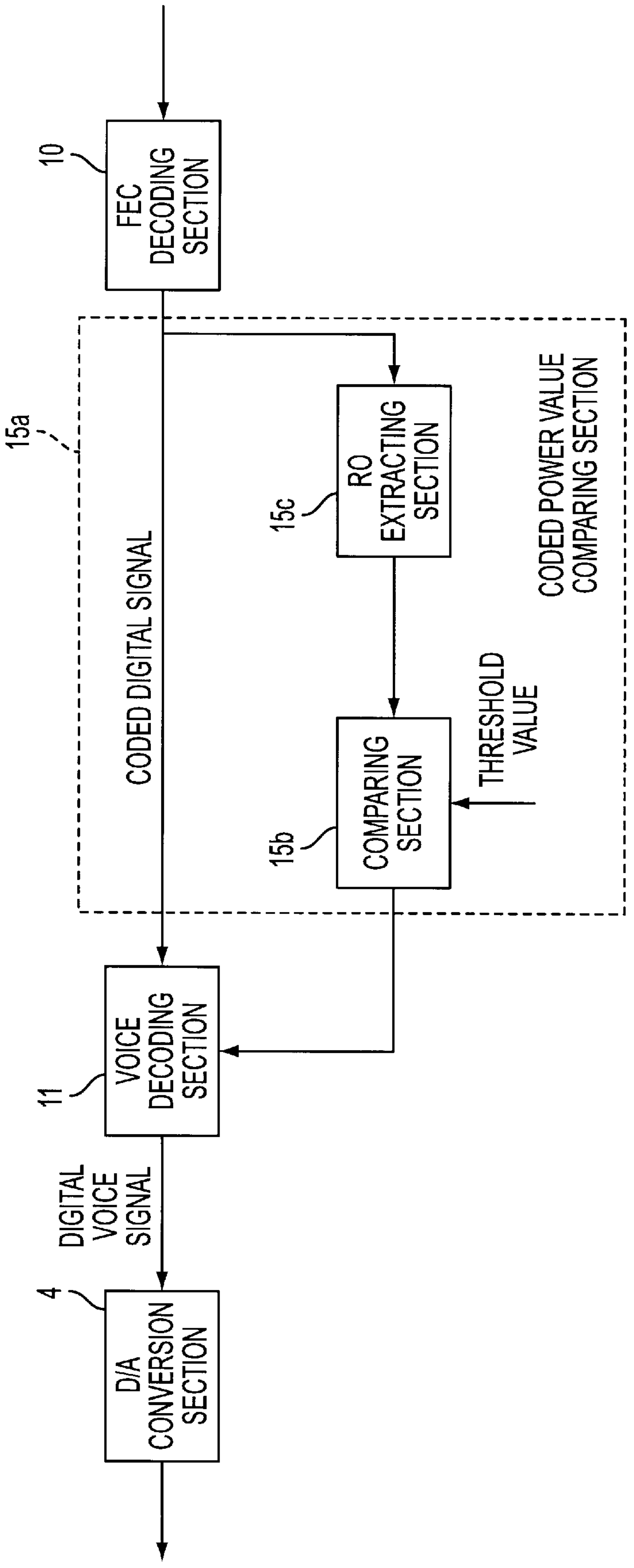
FIG. 14 is a block diagram illustrating the inner construction of the coded power value comparison section of FIG. 13.
Figure 15:
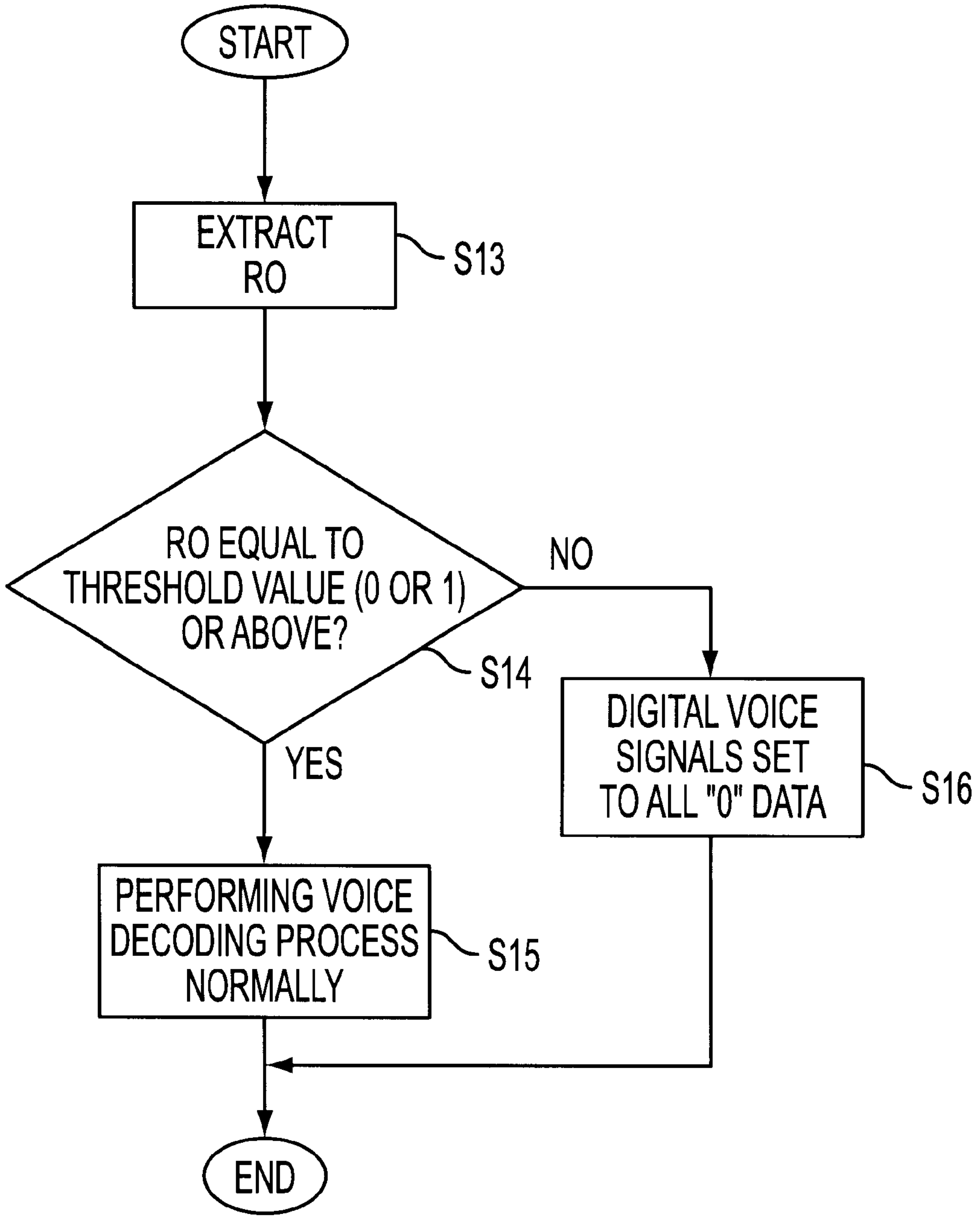
FIG. 15 is a flowchart for describing the operation of the mobile communication equipment of FIG. 13.

FIG. 13 is a block diagram illustrating the construction of mobile communication equipment in accordance with another embodiment of the present invention. With the mobile communication equipment 150 according to this embodiment, a coded power value comparing section 15A has been provided to the decoding side of the digital voice signal processing section 5. FIG. 14 shows an internal block diagram of the coded power value comparing section 15A. The components in FIG. 13 and FIG. 14 which are the same as or equivalent to those in the above embodiments are given the same reference numerals. Also, FIG. 15 shows an operational flowchart for the coded power value comparing section 15A.

Here, the forward error correction decoding section 10 comprises the forward error correction decoding means; the coded power value comparing section 15A and the voice decoding section 11 comprise the decoding means; and the D/A conversion section 4 comprises the D/A conversion means.

The operation of the mobile communication equipment shown in FIG. 13 to FIG. 15 will now be described. At the receiving side, of the information which is transmitted from the transmitting side, the coded digital voice signals are extracted.

The parameters for the coded power value R0 based on the VSELP algorithm which indicates the frame power of the coded digital voice signals are extracted by the R0 extracting section 15*c* within the coded power value comparing section 15A (Step S13), comparison is made in the comparing section 15*b* of this extracted R0 value with a preset threshold value, and in the event that R0=0 or 1, it is determined to be at a noise level, and the determination results are transferred to the voice decoding section 11 (Step S14). In the event that the R0 value is equal to or greater than the threshold value, the data decoding section 11 outputs the coded digital signals input from the forward error correction decoding section 10 via the coded power value comparing section 15A as signals converted to digital voice signals by means of standard VSELP decoding processing (Step S15).

On the other hand, When the R0 value is smaller than the threshold value, the voice decoding section 11 does not conduct standard VSELP decoding processing of the coded digital signals input from the forward error correction decoding section 10 via the coded power value comparing section 15A, but rather the digital voice signals are replaced with digital voice signals at the same level as when nothing is input (for example, the digital voice signals are set to all "0" data) and output (Step S16).

The replaced digital voice signals are directly input to the D/A converter 4, the noise-controlled digital voice signals are converted into analog voice signals, and output from the speaker 3.

With the above-described construction, since the coded power value comparing section 15A extracts the parameters for the coded power value R0 which indicates the frame power of the coded digital signals, and when the R0 is smaller than the threshold value, voice decoding processing at the voice decoding section 11 can be omitted. Thus, the determination accuracy is improved, and it is possible to shorten the processing time and to reduce consumption of power.

SIXTH EMBODIMENT

Figure 16:
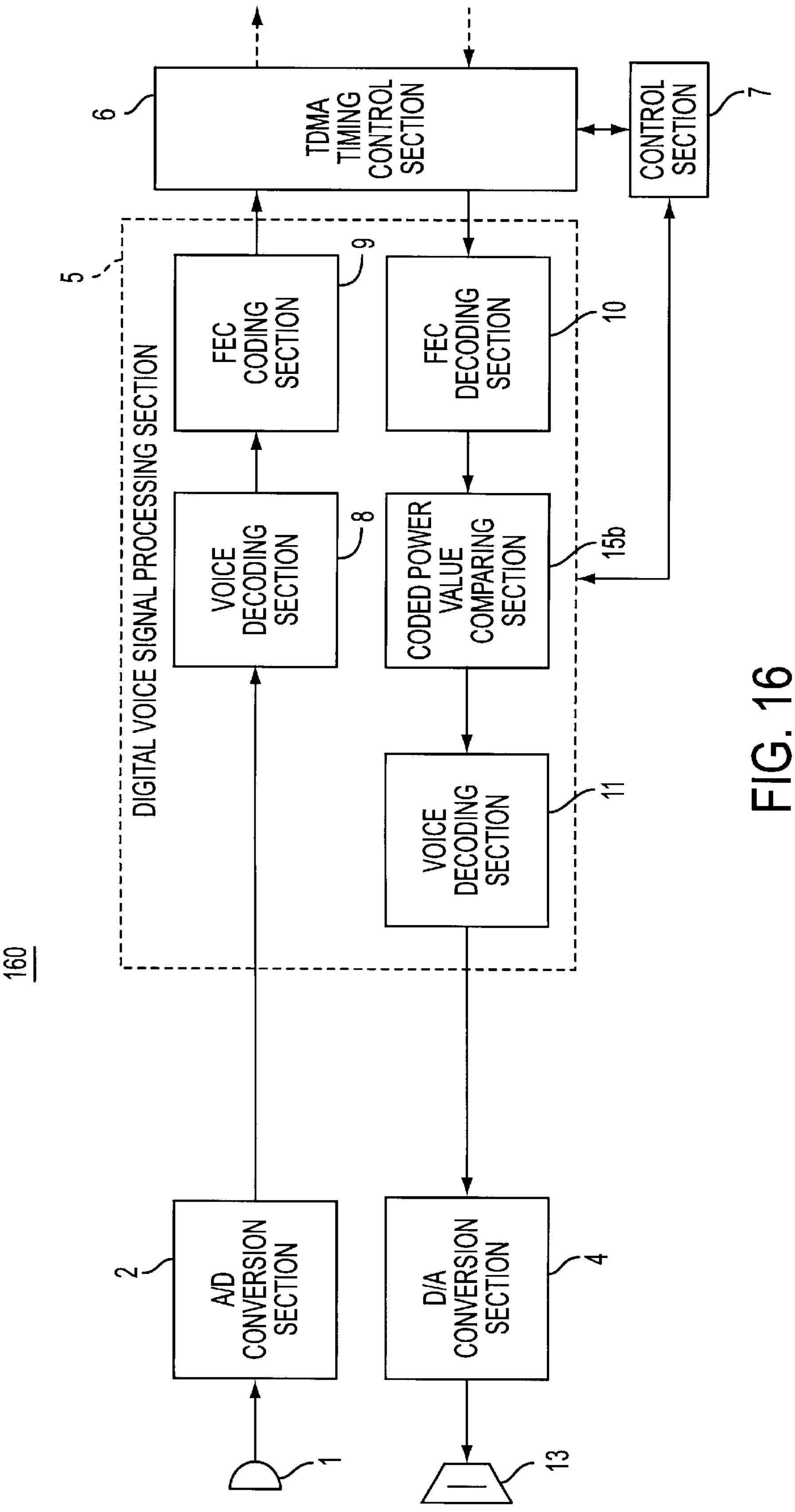
FIG. 16 is a block diagram illustrating the construction of mobile communication equipment in accordance with another embodiment of the present invention.
Figure 17:
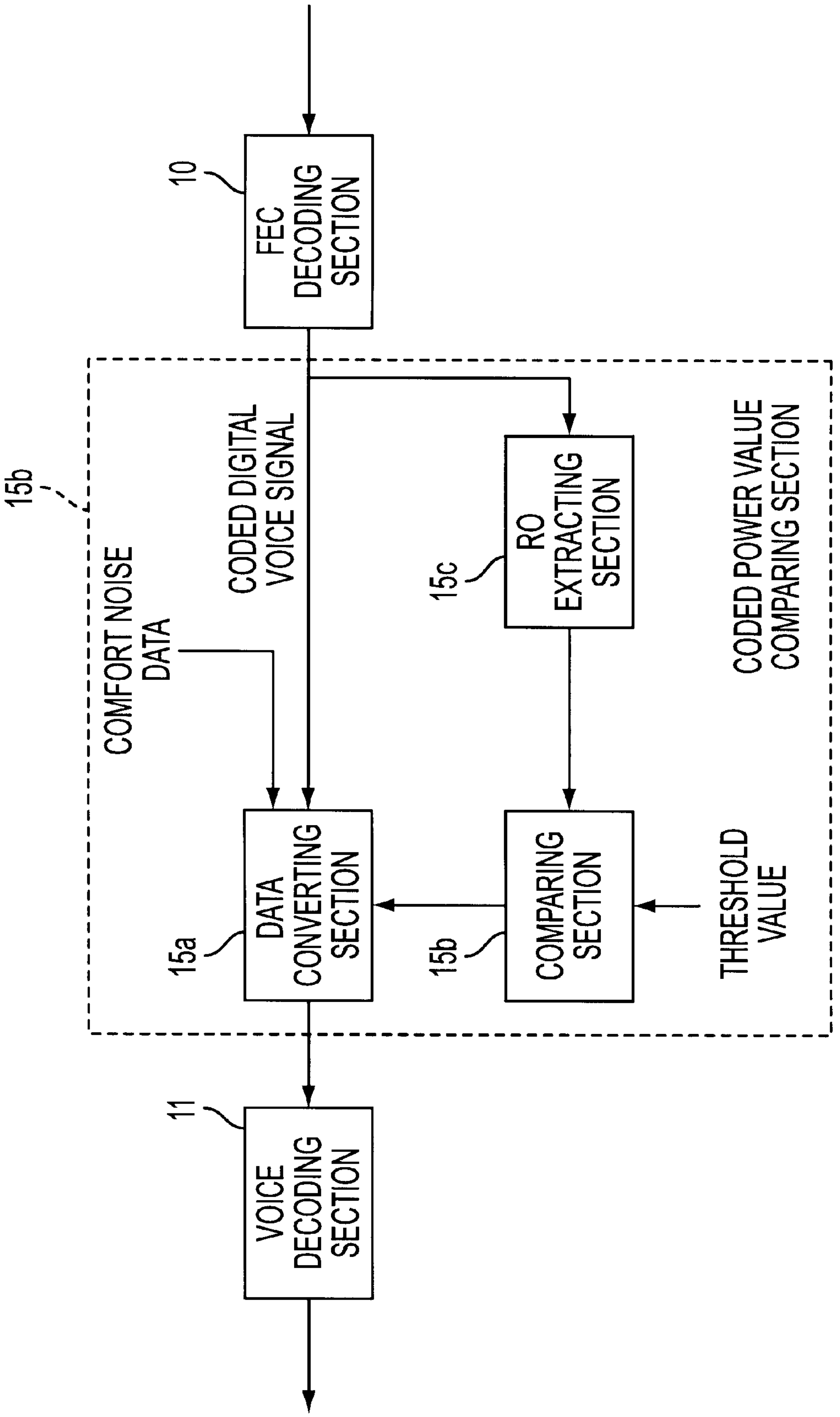
FIG. 17 is a block diagram illustrating the inner construction of the coded power value comparison section of FIG. 16.
Figure 18:
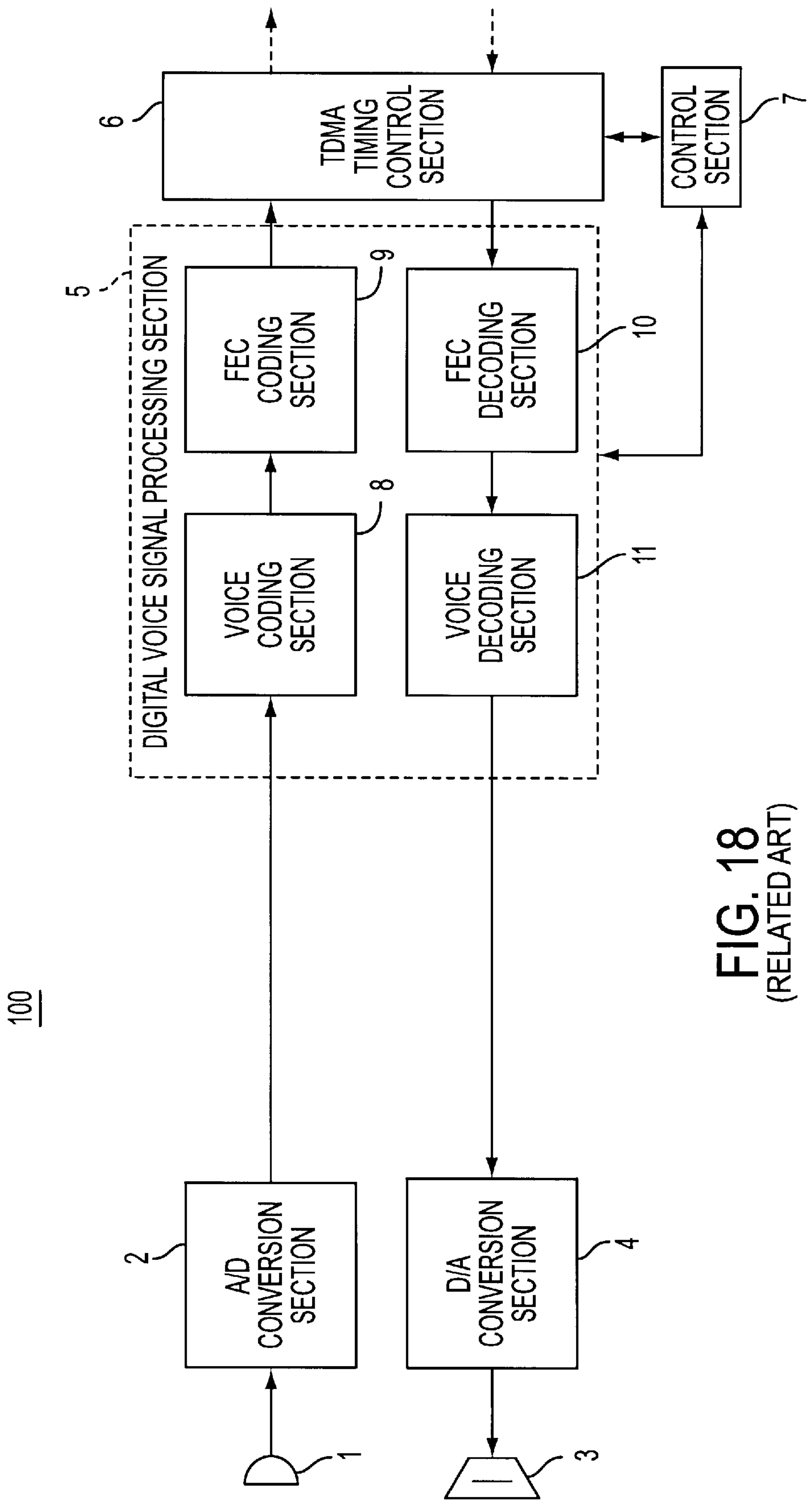
FIG. 18 (RELATED ART)
FIG. 18 is a block diagram illustrating the construction of known mobile communication equipment.

FIG. 16 is a block diagram illustrating the construction of mobile communication equipment in accordance with another embodiment of the present invention. With the mobile communication equipment 160 according to this embodiment, a coded power value comparing section 15B has been provided to the decoding side of the digital voice signal processing section 5. FIG. 17 shows an internal block diagram of the coded power value comparing section 15B. The components in FIG. 16 and FIG. 17 which are the same as or equivalent to those in the above embodiments are given the same reference numerals.

Here, the forward error correction decoding section 10 comprises the forward error correction decoding means; the coded power value comparing section 15B and the voice decoding section 11 comprise the decoding means; and the D/A conversion section 4 comprises the D/A conversion means.

The operation of the mobile communication equipment shown in FIG. 16 and FIG. 17 will now be described. Also, the processing in the following operations is basically the same as that of the flowchart shown in FIG. 10, so explanation with reference to a flowchart will be omitted here.

At the receiving side, of the information which is transmitted from the transmitting side, the coded digital voice signals are extracted. The coded power value comparing section 15B replaces the coded digital voice signals decoded by the forward error correction decoding section 10 with coded digital voice signals for generating comfort noise, according to the method used in the fourth embodiment.

The replaced noise-controlled coded digital voice signals are decoded by the voice decoding section 11, converted into analog voice signals by the D/A conversion section 4, and output from the speaker 3.

With the above-described construction, since the coded power value comparing section 15B extracts the parameters for the coded power value R0 which indicates the frame power of the coded digital signals, and when the R0 is smaller than the threshold value, part of the coded digital voice signals decoded by the forward error correction decoding section 10 are replaced with coded digital voice signals for generating comfort noise. Thus, the determination accuracy of the noise level is improved, so that the noise level can be accurately determined, and voice signals which would become irritating sounds can be prevented from being transmitted.

As described above, according to a first aspect of the present invention, the mobile communication equipment comprises: an A/D conversion means for converting analog voice signals into digital voice signals; voice coding means for calculating the voice power value of the digital voice signals from the A/D converter and outputting the aforementioned digital voice signal as it is when the voice power value is equal to or greater than a predetermined value and for outputting the aforementioned digital voice signal as zero when the voice power value is smaller than the predetermined value; and forward error correction coding means for inputting the coded digital voice signals from the coding means and for outputting the coded digital voice signals on which forward error correction coding has been performed; wherein the voice power value can be calculated and compared with a threshold value to determine the noise level, so that effects can be obtained such as being able to provide for mobile communication equipment wherein the determination accuracy of the noise level is improved, so that the noise level can be accurately determined, and voice signals which would become irritating sounds can be prevented from being transmitted.

According to a second aspect of the present invention, the coding means comprises: a voice power calculating section for calculating the voice frame power value of the digital voice signals from the aforementioned A/D converter as voice power value; a noise level comparing section for outputting the aforementioned digital voice signal as it is when the voice power value is equal to or greater than a predetermined value and for outputting the aforementioned digital voice signal as zero when the voice power value is smaller than the predetermined value; and a voice coding section for outputting the aforementioned digital voice signals output by the noise level comparing section as voice-coded digital voice signals; wherein the voice power calculating section calculates the voice frame power value by means of auto-correlation function calculation or the like, and the noise level comparing section compares the voice frame power value with a threshold value, so that effects can be obtained such as being able to provide for mobile communication equipment wherein the determination accuracy of the noise level is improved, so that the noise level can be accurately determined, and voice signals which would become irritating sounds can be prevented from being transmitted.

According to a third aspect of the present invention, the coding means of the digital mobile communication equipment comprises: a voice coding section for calculating the R0 value from VSELP processing of the digital voice signals from the aforementioned A/D converter as voice power value, which then conducts voice coding processing from the voice power value and outputs the coded digital voice signal when the voice power value is equal to or greater than a predetermined value, and takes the voice power value to be zero when the voice power value is smaller than the predetermined value so that no voice coding processing is conducted; wherein the coded power value R0 is set at "0" when the voice power value is smaller than the threshold value, whereby voice coding processing can be omitted, so that effects can be obtained such as being able to provide for mobile communication equipment wherein the determination accuracy of the noise level is improved, and it is possible to shorten the voice coding processing time and to reduce consumption of power.

According to a fourth aspect of the present invention, the voice coding section of the digital mobile communication equipment outputs coded digital voice signals for generating comfort noise when the voice power value is smaller than the predetermined value, so that effects can be obtained such as being able to provide for mobile communication equipment wherein the determination accuracy of the noise level is improved, so that the noise level can be accurately determined, and voice signals which would become irritating sounds can be prevented from being transmitted.

According to a fifth aspect of the present invention, the coding means of the digital mobile communication equipment comprises: a voice coding section for converting digital voice signals from the aforementioned A/D conversion means into coded digital voice signals; and a coded power comparison section for calculating the R0 value based on VSELP algorithms of the coded digital voice signals from the voice coding section as voice power value, which then outputs the aforementioned coded digital voice signal as it is when the voice power value is equal to or greater than a predetermined value, and outputs coded digital voice signals for generating comfort noise when the voice power value is smaller than the predetermined value; wherein the coded power value comparing section extracts the parameters for the coded power value R0 which indicates the frame power of the coded digital signals, and when the R0 is smaller than the threshold value, coded digital voice signals for generating comfort noise are output, so that effects can be obtained such as being able to provide for mobile communication equipment wherein the determination accuracy of the noise level is improved, so that the noise level can be accurately determined, and voice signals which would become irritating sounds can be prevented from being transmitted.

According to a sixth aspect of the present invention, the mobile communication equipment comprises: forward error correction decoding means for performing forward error correction to received coded digital voice signals and outputting the decoded coded digital voice signals thereof; decoding means for calculating the voice power value regarding the coded digital voice signals from the forward error correction decoding means and outputting the digital voice signal decoded as it is from the coded digital signal when the voice power value of the coded digital voice signals is equal to or greater than a predetermined value, and for outputting signals as a voice power value of zero when the voice power value is smaller than the predetermined value; and D/A converting means for converting digital voice signals output from the decoding means into analog voice signals; wherein the voice power value can be calculated and compared with a threshold value to determine the noise level, so that effects can be obtained such as being able to provide for mobile communication equipment wherein the determination accuracy of the noise level is improved, so that the noise level can be accurately determined, and voice signals which would become irritating sounds can be prevented from being transmitted.

According to a seventh aspect of the present invention, the decoding means of the digital mobile communication equipment comprises: a voice decoding section for outputting digital voice signals decoded from the coded digital voice signals from the aforementioned forward error correction decoding means; a voice power calculating section for calculating the voice frame power value of the digital voice signals from the voice decoding section as voice power value; and a noise level comparing section for outputting the aforementioned digital voice signal as it is when the voice power value is equal to or greater than a predetermined value and for outputting the digital voice signal as zero when the voice power value is smaller than the predetermined value; wherein the voice power value calculated by means of the voice power calculating section is compared with a threshold value by means of the noise level comparing section to determine the noise level, so that effects can be obtained such as being able to provide for mobile communication equipment wherein the determination accuracy of the noise level is improved, and irritating sounds can be prevented from being output from the speaker.

According to an eighth aspect of the present invention, there is provided digital mobile communication equipment according to the sixth aspect of the invention, wherein the decoding means comprises: a coded power comparison section for calculating the R0 value based on VSELP algorithms of the coded digital voice signals from the aforementioned forward error correction decoding means as voice power value, and then compares the voice power value with predetermined values; and a voice decoding section which conducts voice decoding processing from the voice power value and outputs the digital voice signal when the voice power value is equal to or greater than a predetermined value, and takes the voice power value to be zero when the aforementioned voice power value is smaller than the predetermined value so that no voice decoding processing is conducted; wherein the coded power value comparing section extracts the parameters for the coded power value R0 which indicates the frame power of the coded digital signals, and when the R0 is smaller than the threshold value, voice decoding processing at the voice decoding section can be omitted, so that effects can be obtained such as being able to provide for mobile communication equipment wherein the determination accuracy of the noise level is improved, and it is possible to shorten the voice coding processing time and to reduce consumption of power.

According to a ninth aspect of the present invention, the voice decoding section of the digital mobile communication equipment outputs digital voice signals for generating comfort noise when the voice power value is smaller than the predetermined value, so that effects can be obtained such as being able to provide for mobile communication equipment wherein the determination accuracy of the noise level is improved, making for improved accuracy of determining the noise level, and irritating sounds can be prevented.

According to a tenth aspect of the present invention, the coding means of the digital mobile communication equipment comprises: a coded power comparison section for calculating the R0 value based on VSELP algorithms of the coded digital voice signals from the aforementioned forward error correction decoding means as voice power value, which then outputs the aforementioned coded digital voice signal as it is when the voice power value is equal to or greater than a predetermined value, and outputs coded digital voice signals for generating comfort noise when the voice power value is smaller than the predetermined value; and a voice decoding section for decoding coded digital voice signals from the aforementioned coded power comparison section; wherein the coded power value comparing section extracts the parameters for the coded power value R0 which indicates the frame power of the coded digital signals, and when the R0 is smaller than the threshold value, part of the coded digital voice signals decoded by the forward error correction decoding section are replaced with coded digital voice signals for generating comfort noise, so that effects can be obtained such as being able to provide for mobile communication equipment wherein the determination accuracy of the noise level is improved, making for improved accuracy of determining the noise level, and irritating sounds can be prevented.

What is claimed is:

1. A digital mobile communication equipment provided with a Speech Coder and Decoder, said mobile communication equipment comprising:

A/D conversion means for converting analog voice signals into digital voice signals divided into frames;

voice coding means for calculating the voice power value of each frame of said digital voice signals from said A/D converter and, for each frame, outputting said digital voice signal as it is when the voice power value is equal to or greater than a predetermined value and outputting the digital voice signal as zero when the voice power value is smaller than said predetermined value; and forward error correction coding means for inputting the coded digital voice signals from said coding means and for outputting the coded digital voice signals on which forward error correction coding has been performed;

wherein said digital mobile communication equipment controls a noise level of the digital voice signal by outputting the digital voice signal as zero for every frame having a voice power value smaller than said predetermined value.

2. The digital mobile communication equipment according to claim 1 wherein said coding means comprising:

a voice power calculating section for calculating the voice frame power value of the digital voice signals from said A/D converter as voice power value;

a noise level comparing section for outputting said digital voice signal as it is when the voice power value is equal to or greater than a predetermined value and for outputting said digital voice signal as zero when said voice power value is smaller than said predetermined value; and a voice coding section for outputting said digital voice signals output by said noise level comparing section as voice-coded digital voice signals.

3. The digital mobile communication equipment according to claim 1 wherein said coding means comprising:

a voice coding section for calculating the R0 value from VSELP processing of the digital voice signals from the A/D converter as voice power value, which then conducts voice coding processing from said voice power value and outputs the coded digital voice signal when said voice power value is equal to or greater than a predetermined value, and takes said voice power value to be zero when said voice power value is smaller than the predetermined value so that no voice coding processing is conducted.

4. The digital mobile communication equipment according claim 1 wherein the voice coding outputs coded digital voice signals for generating comfort noise when the voice power value is smaller than the predetermined value.

5. The digital mobile communication equipment according to claim 4 wherein said coding means comprising:

a voice coding section for converting digital voice signals from the A/D conversion means into coded digital voice signals; and a coded power comparison section for calculating the R0 value based on VSELP algorithms of the coded digital voice signals from said voice coding section as voice power value, which then outputs said coded digital voice signal as it is when said voice power value is equal to or greater than a predetermined value, and outputs coded digital voice signals for generating comfort noise when the voice power value is smaller than said predetermined value.

6. A digital mobile communication equipment provided with a Speech Coder and Decoder, said mobile communication equipment comprising:

forward error correction decoding means for performing forward error correction decoding to received frames of coded digital voice signals and outputting the decoded frames of coded digital voice signals thereof;

decoding means for calculating the voice power value regarding each frame of the coded digital voice signals from said forward error correction decoding means and, for each frame, outputting the digital voice signal decoded as it is from the coded digital signal when the voice power value of the coded digital voice signals is equal to or greater than a predetermined value, and outputting signals as a voice power value of zero when the voice power value is smaller than the predetermined value; and D/A converting means for converting digital voice signals output from said decoding means into analog voice signals;

wherein said digital mobile communication equipment controls a noise level of the digital voice signal by outputting the digital voice signal as zero for every frame having a voice power value smaller than said predetermined value.

7. The digital mobile communication equipment according claim 6 wherein said decoding means comprising:

a voice decoding section for outputting digital voice signals decoded from the coded digital voice signals from said forward error correction decoding means;

a voice power calculating section for calculating the voice frame power value of the digital voice signals from said voice decoding section as voice power value; and a noise level comparing section for outputting said digital voice signal as it is when the voice power value is equal to or greater than a predetermined value and for outputting the digital voice signal as zero when the voice power value is smaller than the predetermined value.

8. The digital mobile communication equipment according to claim 6 wherein said decoding means comprising:

a coded power comparison section for calculating the R0 value based on VSELP algorithms of the coded digital voice signals from said forward error correction decoding means as voice power value, and then compares the voice power value with predetermined values; and a voice decoding section which conducts voice decoding processing from said voice power value and outputs said digital voice signal when the voice power value is equal to or greater than a predetermined value, and takes the voice power value to be zero when said voice power value is smaller than said predetermined value so that no voice decoding processing is conducted.

9. The digital mobile communication equipment according to claim 6 wherein said voice decoding section outputs digital voice signals for generating comfort noise when the voice power value is smaller than the predetermined value.

10. The digital mobile communication equipment according to claim 9 wherein said coding means comprising:

a coded power comparison section for calculating the R0 value based on VSELP algorithms of the coded digital voice signals from said forward error correction decoding means as voice power value, which then outputs said coded digital voice signal as it is when the voice power value is equal to or greater than a predetermined value, and outputs coded digital voice signals for generating comfort noise when said voice power value is smaller than said predetermined value; and a voice decoding section for decoding coded digital voice signals from the coded power comparison section.

* * * * *